United States Patent [19]

Gardziella et al.

[11] Patent Number: 4,634,723

[45] Date of Patent: Jan. 6, 1987

[54] FURFURYL ALCOHOL BINDERS, METHODS FOR THEIR PRODUCTION AND USE

[75] Inventors: Arno Gardziella, Witten; Alois Kwasniok, Iserlohn; Harald Heerdegen, Hagen; Gerhard Janocha, Iserlohn, all of Fed. Rep. of Germany

[73] Assignee: Rütgerswerke Aktiengesellschaft, Frankfurt, Fed. Rep. of Germany

[21] Appl. No.: 714,746

[22] Filed: Mar. 22, 1985

[30] Foreign Application Priority Data

Mar. 31, 1984 [DE] Fed. Rep. of Germany ....... 3412104

[51] Int. Cl.$^4$ ............................ B22C 1/16; C08J 3/24; C08K 5/15; C08L 71/06
[52] U.S. Cl. ...................................... 523/144; 528/249
[58] Field of Search ......................... 523/144; 528/249

[56] References Cited

U.S. PATENT DOCUMENTS

| | | | |
|---|---|---|---|
| 3,549,584 | 12/1970 | Sekera | 523/144 |
| 3,879,339 | 4/1975 | Richard | 523/144 |
| 4,317,763 | 3/1982 | Menting | 523/144 |
| 4,543,374 | 9/1985 | Menting | 523/144 |

FOREIGN PATENT DOCUMENTS

| | | | |
|---|---|---|---|
| 1926663 | 6/1970 | Fed. Rep. of Germany | 523/144 |
| 954084 | 2/1961 | United Kingdom | 523/144 |

OTHER PUBLICATIONS

Bratislava Conference on Polymers 5th 1979 IVPAC, pp. 99–103, Szlezyngier et al., CA 92(10)77199(d).

*Primary Examiner*—Herbert J. Lilling
*Attorney, Agent, or Firm*—Beveridge, DeGrandi & Weilacher

[57] ABSTRACT

A binder material is disclosed formed from furfuryl alcohol suitable for the preparation of molded bodies and cores for molding for the foundry industry based on the following composition:

40–60 weight percent higher molecular weight furfuryl alcohol formaldehyde condensation product
28–40 weight percent lower molecular weight furfuryl alcohol formaldehyde condensation product
12–25 weight percent 2,5-bis-hydroxymethylfuran
0–8 weight percent furfuryl alcohol.

2 Claims, No Drawings

FURFURYL ALCOHOL BINDERS, METHODS FOR THEIR PRODUCTION AND USE

The present invention relates to a binder material based on furfuryl alcohol which is utilized in the fabrication of formed bodies, and in particular, in utilization in the foundry industry.

From German Pat. No. 2,239,835 a method for the preparation of molded bodies is known in which binder materials are used which are acid hardenable resins and which are contacted with sulfur dioxide gas and then hardened in the presence of an oxidation material and water which creates sulfuric acid in situ. Examples of such acid hardenable resins are the furan resins which are used especially for the preparation of molds and cores for light metal casting which are known for their high thermal shock resistance, high cold bending strength and good decomposition of the cores after the casting.

The utilization of these furan resins, however, has the drawbacks in that the preparation of the molded bodies in the mold boxes an unwanted coating or deposit builds up very easily and the gasification jets adhere thereto. The first drawback leads to the fact that the molded bodies change themselves in an undesired manner and the second drawback causes an uneven gasification and therefore an uneven hardening. Form boxes and gasification jets must therefore be cleaned very frequently. This means that a significant and severe interference occurs with respect to the convenient operation in the manufacture of molded bodies.

As a result therefore, there arose the object to provide a binder material for the preparation of molded bodies which is suitable for the casting of light metals and which possesses the good properties of the heretofore furan resins but also reduces the disadvantages of the coating build-up and the clogging which have been the drawbacks in prior known methods.

The solution to this object arises through the utilization of binder materials formed on the basis of furfuryl alcohol which have the following composition:
40-60 weight percent higher molecular weight furfuryl alcohol formaldehyde condensation product
28-40 weight percent lower molecular weight furfuryl alcohol formaldehyde condensation product
12-25 weight percent 2,5-bis-hydroxymethylfuran
0-8 weight percent furfuryl alcohol In particular, the objects of the present invention are achieved by the foregoing composition wherein the furfuryl alcohol and formaldehyde are present in a molar ratio of 1:0.6-1 with a pH in the range of 2.5 to 6 and with a condensation product has a viscosity ranging from about 800 to 900 mPa's. Further, in preparing these products, the water and the furfuryl alcohol which is not converted is distilled off.

The conventional furan resins are essentially higher molecular weight acid condensed furfuryl alcohol-formaldehyde condensation products which in general contain 15 to 50 weight percent furfuryl alcohol. Higher molecular weight furfuryl alcohol formaldehyde condensates are those that have more than 4 furan nuclei rings per molecule. These high viscosity or solid products are dissolved in furfuryl alcohol and through the use of furfuryl alcohol, the desired viscosity is also achieved ranging from 100 to 300 mPa's. The added furfuryl alcohol has however an additional function in that it is required for the necessary hardening activity.

The higher molecular weight furfuryl alcohol formaldehyde condensation products are very slow to react. In order that the desired speed of hardening is achieved in the preparation of molded bodies, the higher molecular weight condensates must be activated. It is for this reason that the high proportion of furfuryl alcohol in the furan resin was considered necessary.

On the other hand, it has been observed that the build-up of the coating in the core boxes and the clogging and stickiness is caused by the furfuryl alcohol and the resulting condensation product. From this observation, it has been suggested that the utilization of furfuryl alcohol should be limited and that instead of using the slow to react higher molecular weight furan resin, there be used instead the reactive lower molecular weight furan resins. However, this alternative does not lead to a satisfactory solution because the lower molecular weight furan resins which have 2 to 4 nuclei per molecule harden only to a specified incomplete solidification. Accordingly, by using a mixture containing on the average a lower molecular weight furan resin and hardening with sulfur dioxide, there is obtained essentially no coating of the core boxes but only a cold bending strength of the hardened form bodies of about 100 to 150 N/cm$^2$. It is necessary, however, because of technical requirements in the foundry to obtain a cold bending strength of 300 to 600 N/cm$^2$.

It has now been discovered that binder material mixtures which contain the following components are notable because of the speed of hardening that is obtainable, because of the economic manufacturing process whereby the desired formed bodies of the noted strength values are obtainable, and because the undesired coating of the boxes and the stickiness and clogging of the gas jets can be reduced even after many shaped bodies are formed and can be reduced to an acceptable minimum value. The composition is set forth below:
40-60 weight percent higher molecular weight furfuryl alcohol formaldehyde condensation product
28-40 weight percent lower molecular weight furfuryl alcohol formaldehyde condensation product,
12-25 weight percent 2,5-bis-hydroxymethylfuran.

The compositions of the present invention can optionally include up to 8 weight percent furfuryl alcohol, based on the total binder material mixture, without having the undesirable coating build-up and without the stickiness being noticeable.

The binder materials of the present invention can be produced by mixing of the individual components. It is advantageous to obtain them directly by the condensation of furfuryl alcohol with formaldehyde whereby their composition is predetermined through the choice of reaction conditions. Starting material are pure or technical grade furfuryl alcohol and formaldehyde or a substance which under the reaction conditions produces formaldehyde. Products known in the art are, for example, formaldehyde itself, which is commercially available in an 30 to 50% aqueous solution (formalin), formaldehyde bisulfite, trioxymethylene or paraformaldehyde. The reactants are reacted together in a molar ratio of 1:0.6 to 1 in a weakly acidic medium, preferably with a pH in the range of 2.5 to 6. The control over the pH value is carried out in an advantageous manner with acetic acid which can also be buffered with a limited amount of caustic lye. The conversion is carried through at a temperature between 100 and 140° C. and according to the reaction temperature requires 3 to 12 hours. The reaction is concluded by a neutralization of the reaction mixture when a viscosity of the reaction mixture of 800 to 900 mPa's (20° C.) is obtained.

The resulting mixture contains in additon to the higher molecular products also the low molecular weight condensation product in the desired ratio; as well as 15 to 20 weight percent 2,5-bis-hydroxymethylfuran in addition to small amounts of unreacted furfuryl alcohol and water. The water and optionally the furfuryl alcohol and also optionally the limited amounts of 2,5-bis-hydroxymethylfuran are distilled off and this results in a resin mixture which has a viscosity at 20° C. of 8,000 to 10,000 mPa's. This binder material is particularly suited for the preparation of cores and molded forms which are hardened or cured with sulfur dioxide. However, the product is mostly desired with a lower viscosity approximately 300 mPa's in order to permit easier mixing with the foundry sand. This viscosity is achieved through the addition of approximately 10 weight percent of a lower alcohol, preferably ethanol. It is also possible, as is conventional in the art of core and formed sand binder materials with furan resins, to add about 0.25 weight percent of a silane.

The following examples serve to illustrate the present invention without limiting it in any respect.

EXAMPLE 1

980 g of a technical grade furfuryl alcohol and 300 g paraformaldehyde (96%) after addition of 50 ml acetic acid and 1 ml 50% sodium brine are heated with stirring to boiling and then held for 4 hours at this temperature. Thereafter, the reaction mixture is neutralized with sodium brine and 140 ml water and 203 g furfuryl alcohol are distilled off. There is obtained 910 g of binder material which is mixed with 2.5 g aminosilane and 90 g methanol and thereby a viscosity of 300 mPa's is obtained. 150 g of this solution are mixed with 60 g of methylethylketone peroxide (50% in a sensitizing material) and 15 kg quartz sand. Utilizing the mass obtained thereby, a gas jet connected core box was filled 20 times one after the other with an amount of 1 kg of the mass, followed by gasing with a stream of SO$_2$ for 1 second and exposure to air for 20 seconds. The molded bodies formed thereby possess after 1 hour a cold bending strength of 530 N/cm$^2$. The core box and gasification jet show neither a noticeable coating nor a stickiness after the end of the experiments. Temperature shock resistance and destructibility of the formed bodies after casting characterize these formed bodies which are prepared with a commercial furan resin.

COMPARATIVE EXAMPLE 1

Following the procedure of Example 1, a commercially available furan resin, the viscosity of which is adjusted to 300 mPa's with furfuryl alcohol is used as the binder material. After 10 fillings of the casting forms and gasification, there is formed in the core boxes a solid coating which has an average thickness of 0.25 mm and the gasification jet is likewise clogged to the extent of 20%.

COMPARATIVE EXAMPLE 2

In the same manner as shown in Example 1, a furan resin which contains on the average 2 to 4 furan nuclei per molecule is utilized as a binder material. After the hardening, the cold bending strength is 145 N/cm$^2$. This strength could not be raised by means of a thermal after treatment.

COMPARATIVE EXAMPLE 3

Following the process as described in Example 1, there is used as a binder material the same substance together with a technical grade of 2,5-bis-hydroxymethylfuran. With hardening, there is eventually obtained a cold bending strength of 110 N/cm$^2$.

Further variations and modifications of the present invention will be apparent to persons skilled in the art from a study of the foregoing and such changes and modifications are intended to be encompassed by the claims appended hereto.

The German priority document P No. 34 12 104.8 is relied on and incorporated herein by reference.

We claim:

1. A binder material based on furfuryl alcohol for the preparation of formed bodies and molded bodies comprising the following composition in percent by weight based on the total composition:
   40–60 weight percent furfuryl alcohol formaldehyde condensation product, wherein there are more than 4 furane nuclei rings per molecule
   28–40 weight percent furfuryl alcohol formaldehyde condensation product, wherein there are from 2 to 4 furane nuclei rings per molecule
   12–25 weight percent 2,5-bis-hydroxymethylfuran
   0–8 weight percent furfuryl alcohol.

2. The method for the preparation of a binde material having the composition:
   40–60 weight percent furfuryl alcohol formaldehyde condensation product, wherein there are more than 4 furane nuclei rings per molecule
   28–40 weight percent furfuryl alcohol formaldehyde condensation product, wherein there are from 2 to 4 furane nuclei rings per molecule
   12–25 weight percent 2,5-bis-hydroxymethylfurane
   0–8 weight percent furfuryl alcohol
   comprising mixing furfuryl alcohol and formaldehyde in the ratio of 1:0.6–1 at a pH value of 2.5 to 6 to obtain a condensation product having a viscosity of 800–900 mPa's,
   thereafter distilling water and unreacted furfuryl alcohol to thereby recover the reaction product.

* * * * *